Figure 1:
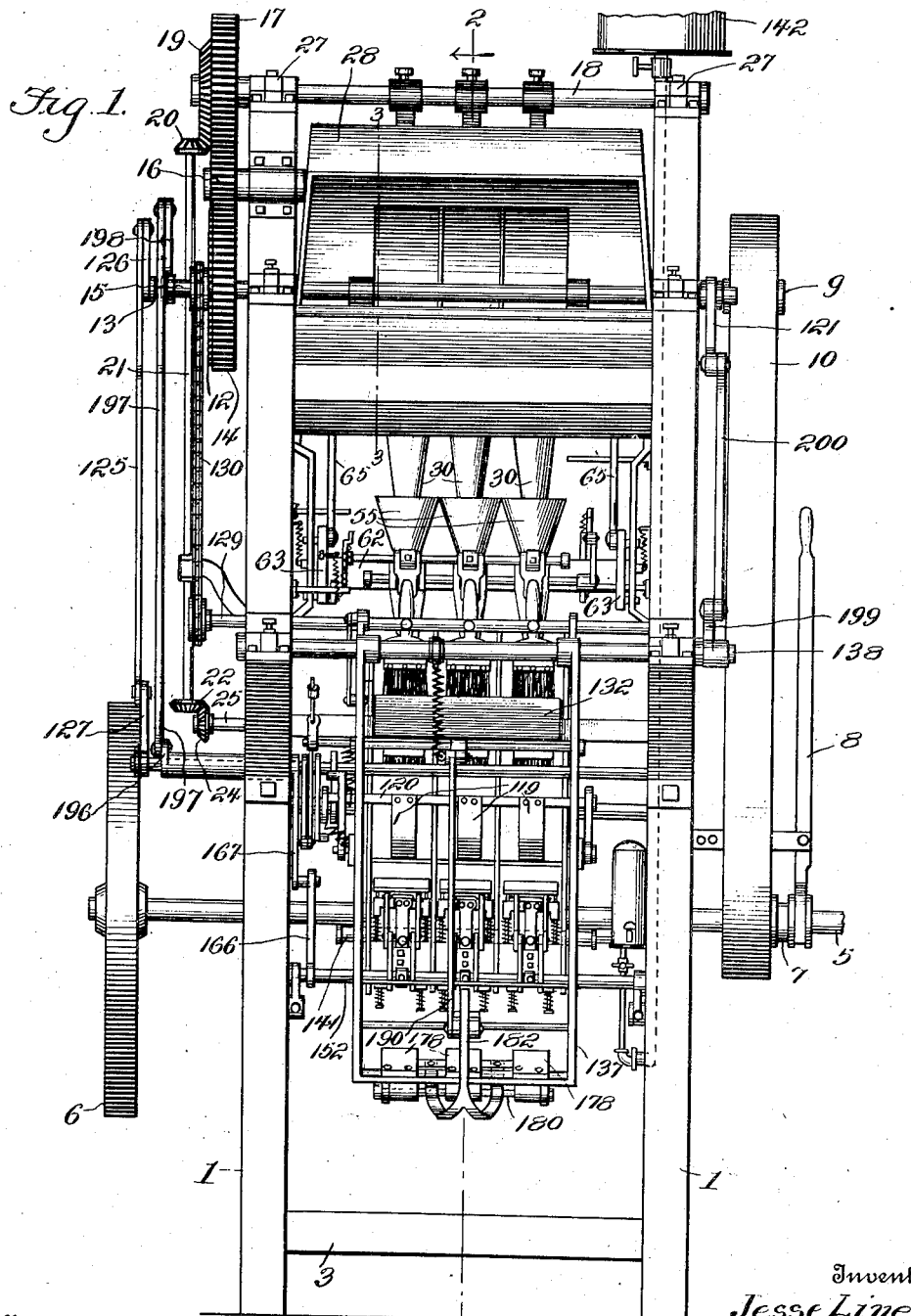

J. LINES.
SEED BAG FILLING AND SEALING MACHINE.
APPLICATION FILED AUG. 10, 1910.

997,145.

Patented July 4, 1911.
7 SHEETS—SHEET 2.

Witnesses
J. T. L. Wright
U. B. Hillyard.

Inventor
Jesse Lines,
By Victor J. Evans,
Attorney

J. LINES.
SEED BAG FILLING AND SEALING MACHINE.
APPLICATION FILED AUG. 10, 1910.
997,145.
Patented July 4, 1911.
7 SHEETS—SHEET 3.
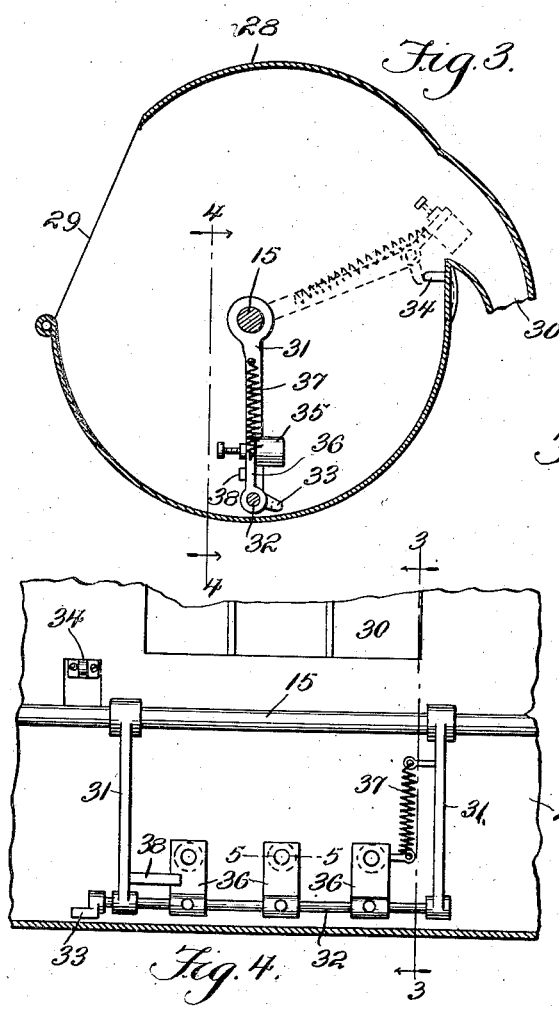
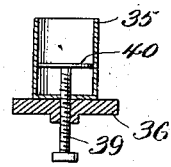
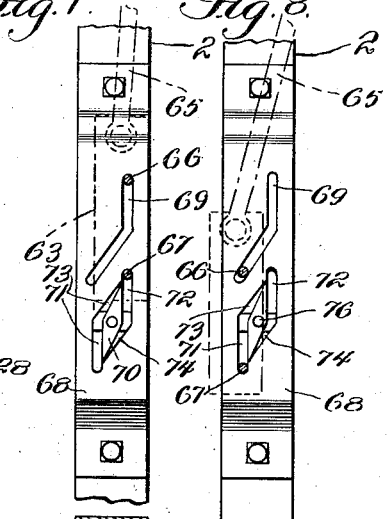
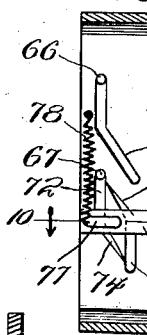
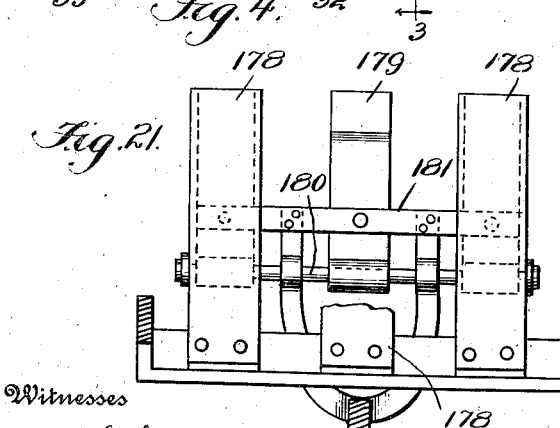
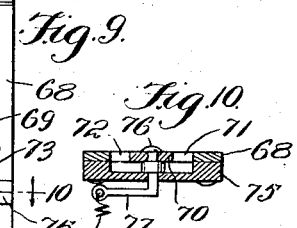
Witnesses
J. T. L. Wright.
V. B. Hillyard.
Inventor
Jesse Lines
By Victor J. Evans
Attorney

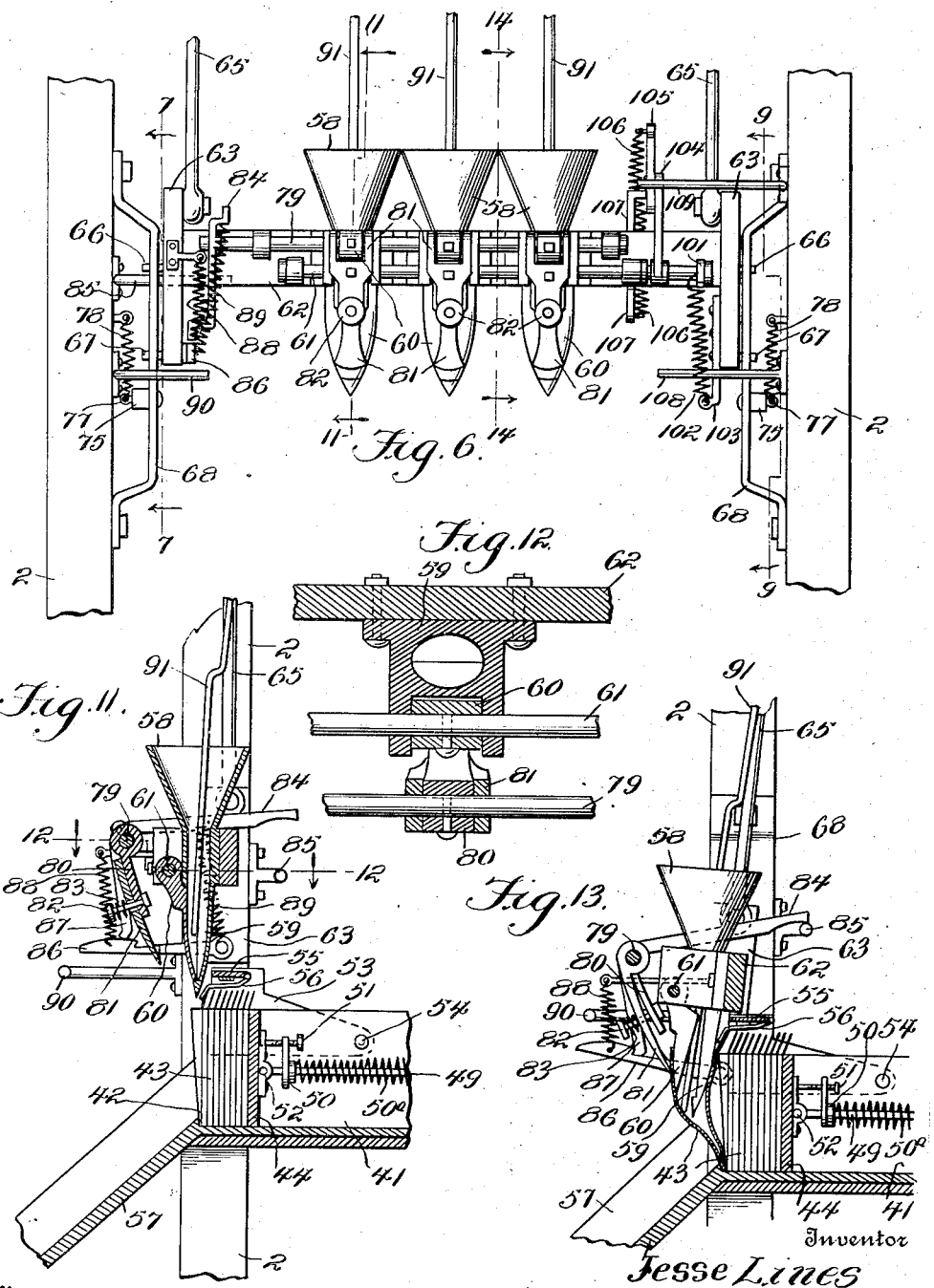

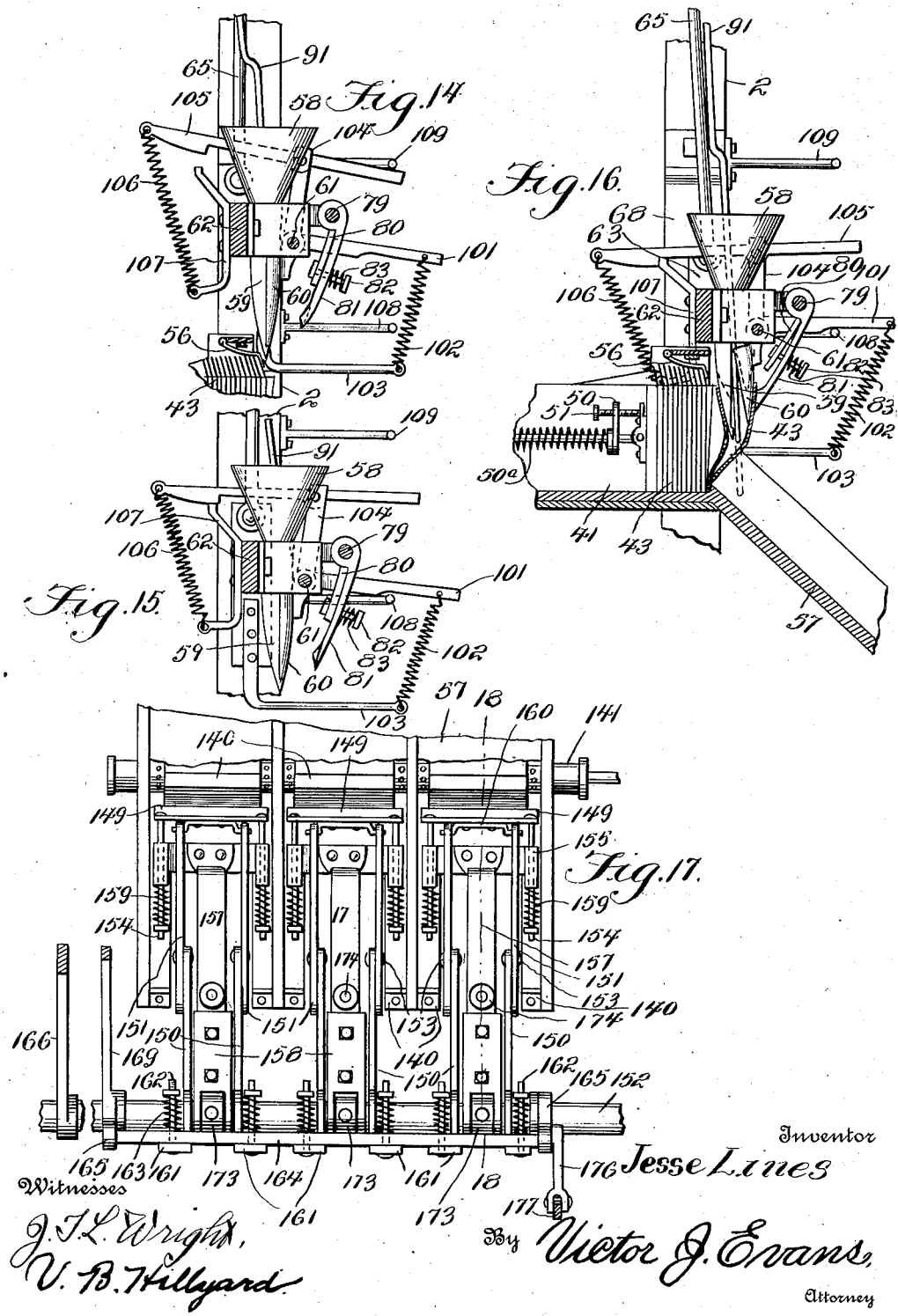

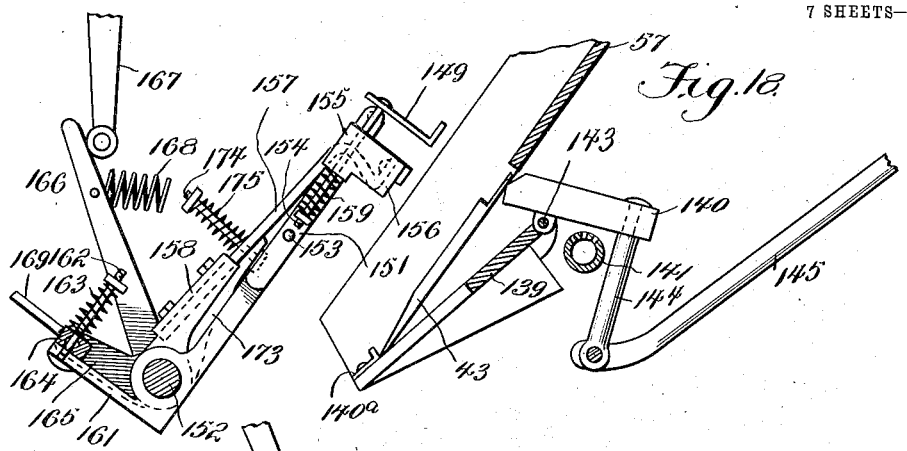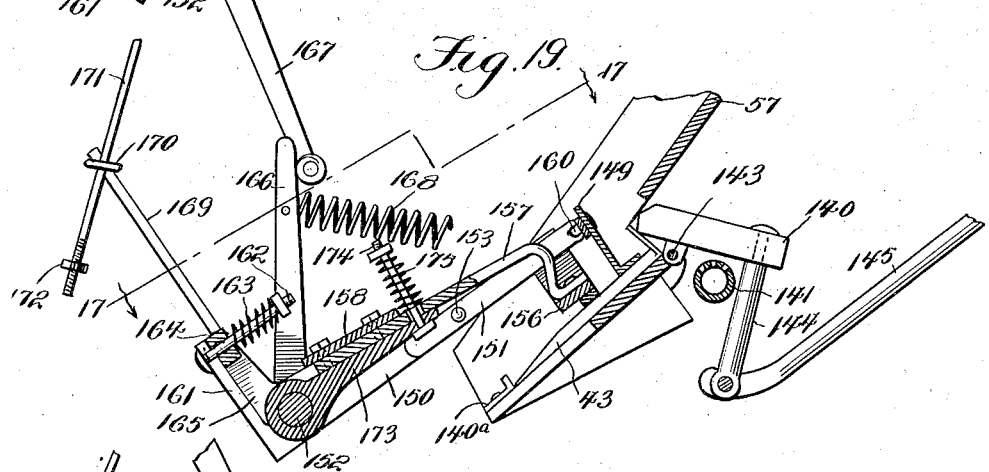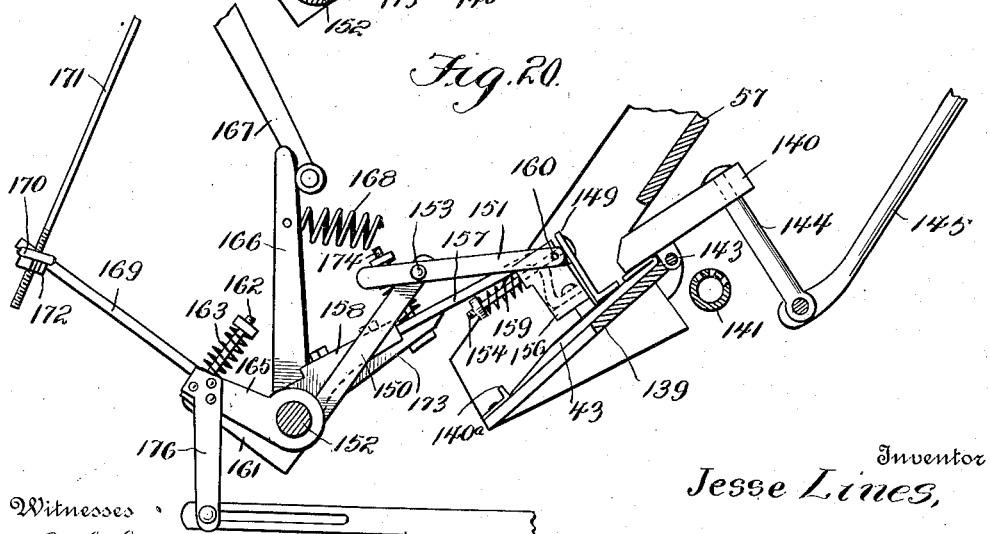

J. LINES.
SEED BAG FILLING AND SEALING MACHINE.
APPLICATION FILED AUG. 10, 1910.
997,145.
Patented July 4, 1911.
7 SHEETS—SHEET 7.
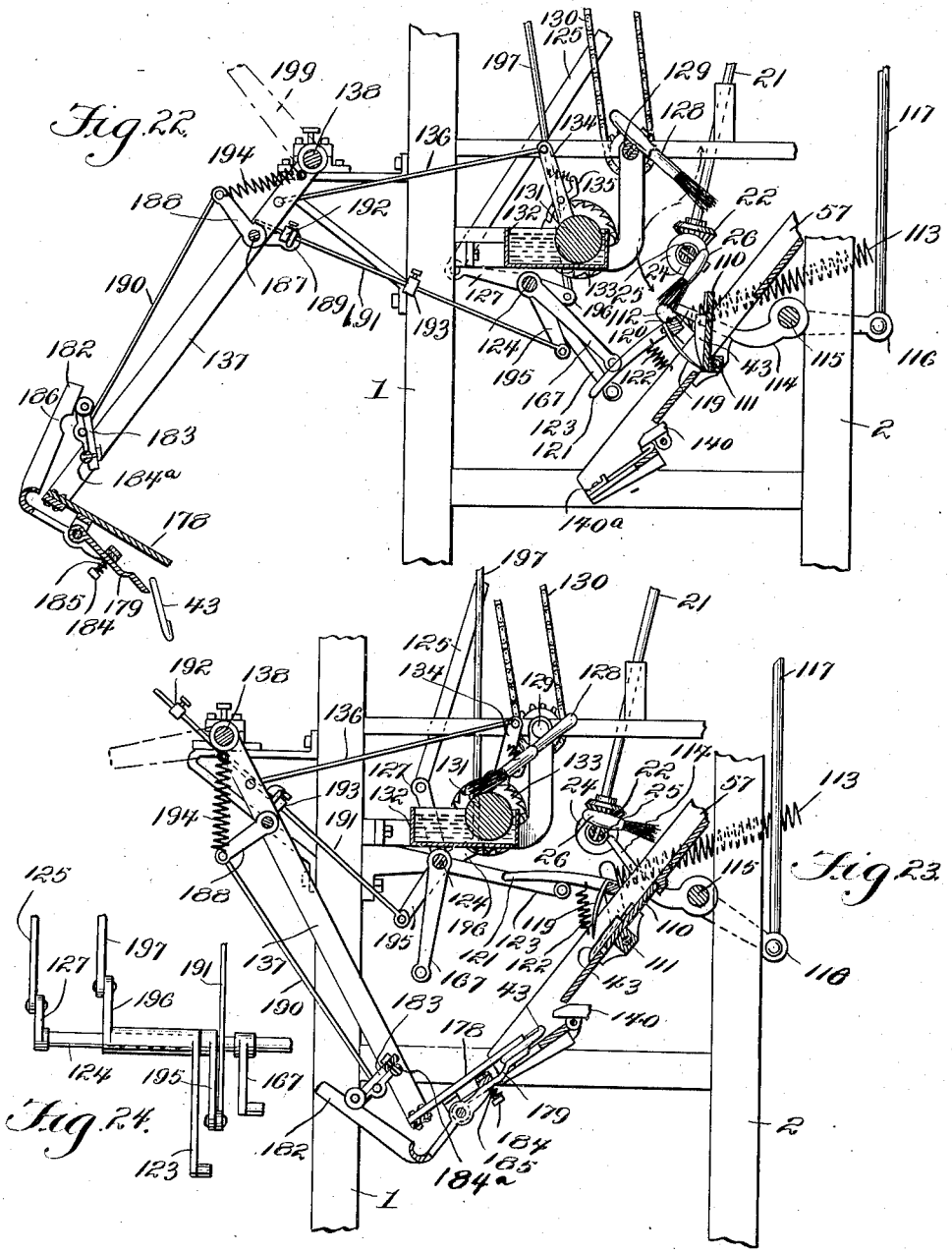

UNITED STATES PATENT OFFICE.

JESSE LINES, OF SABETHA, KANSAS.

SEED-BAG FILLING AND SEALING MACHINE.

997,145. Specification of Letters Patent. Patented July 4, 1911.

Application filed August 10, 1910. Serial No. 576,538.

*To all whom it may concern:*

Be it known that I, JESSE LINES, a citizen of the United States, residing at Sabetha, in the county of Nemaha and State of Kansas, have invented new and useful Improvements in Seed-Bag Filling and Sealing Machines, of which the following is a specification.

The present invention appertains to machinery for filling flat packets, such as small paper bags, with seed or other commodity in measured quantity, pasting the flaps of the bags, folding and sealing the flaps and finally removing the packets from the machine and delivering the packets at a predetermined point of discharge.

The machine embodies a feeding mechanism of unique structure for supplying the material in regulated quantity to be filled into the packets or flat containers such as paper bags having sealing flaps, said feeding mechanism comprising a hopper to receive the material in bulk and a distributer to operate in the hopper to effect discharge of the predetermined amount of material therefrom at each operation, the delivery mechanism being adjustable to admit of varying the quantity delivered at each operation, and spouts leading from the hopper to direct the material to the proper points of discharge to be received in the packets or containers.

The invention further contemplates holders which receive the material from the spouts of the feeding mechanism and direct such material into the bags or containers, said holders also serving to enter the bags and remove them from the magazine one at a time. Combined with the holders are means for gripping the bags to insure their removal from the magazine, said bag gripping means being automatically tripped to effect release of the bags in advance of the operation of ejecting means, whereby the bags when filled and removed from the magazine are detached from the holders so that they may pass to a position for the next step in the operation, namely, to have paste or like adhesive applied to the sealing flap. The bag holders and the coöperating gripping mechanism involve a novel structure, the parts being of such formation and arrangement as to insure positive action and efficiency in operation, while at the same time enabling the parts to be gotten at easily for adjustment or replacement when necessary. The bag holders embody a funnel and a bag entering portion, the latter comprising two parts which are normally closed so as to retain the material until said portion enters the bag when the parts open to admit of the material discharging. The bag gripping member comprises a yieldable portion, which by preference is arranged to coöperate with the movable part of the bag entering portion of the holder. The ejector operates through the holder and between the members of the bag entering portion and incidental to serving as means for positively detaching the bag from the holder it also serves to prevent any of the material remaining in the holder, since the movement of the ejector therethrough agitates any material remaining therein and insures discharge thereof, with the result that each packet or container receives the full amount of material designed to be supplied thereto.

The invention further contemplates a pasting mechanism of peculiar structure and combined therewith are means for arresting movement of the bags or containers after the same have been filled and detached from the bag holders, said mechanism besides arresting the filled bags further serving to move the bags to bring their sealing flaps into the path of the paste distributer to insure the application of a sufficient quantity of paste or like adhesive to the sealing flaps for securing them when folded and pressed upon the body of the bags. The pasting mechanism embodies a box or receptacle for holding a quantity of paste, a distributer for taking up a quantity of the paste and a brush for receiving the paste from the distributer and applying the same to the sealing flaps of the bags. Combined with the pasting and bag arresting mechanisms are means for imparting the necessary movements thereto in accordance with the spirit of the invention to insure a harmonious action of the working parts, whereby unnecessary movement is prevented and a machine produced having a maximum capacity of output.

A further purpose of the invention is the provision of devices for folding the flaps of the bags or containers after paste has been applied thereto and for sealing such flaps when folded, the sealing mechanism embodying means for setting or drying the paste by utilizing heat, the latter being applied in the form of a heated presser member, which while pressing the sealing flap into final position also sets the paste or adhesive by being heated. The sealing mechanism embodies means for folding the sealing flaps and means for pressing such flaps when folded and at the same time applying heat to the sealing flaps to prevent their loosening upon release of the bags from the compressive force of the sealing means.

The machine further embodies delivery mechanism for removing the sealed packets, bags or containers from the sealing mechanism and delivering the same to a predetermined point of discharge, the delivery mechanism being positive in operation and embodying gripping means for taking hold of the packets and carrying them to a given point and releasing their hold, thereby permitting the packets to automatically drop clear of the machine.

In connection with the several mechanisms herein referred to as forming adjunctive parts of the machine as a whole it may be stated that the invention further extends to the devices associated with the working parts and forming elements thereof and which are referred to in detail in the following description, illustrated in the accompanying drawings and pointed out at length in the appended claims.

It is to be understood that the drawings illustrate the preferred embodiment of the invention, but that various changes may be resorted to in adapting the invention for certain needs without departing from the spirit of the invention.

Figure 2:
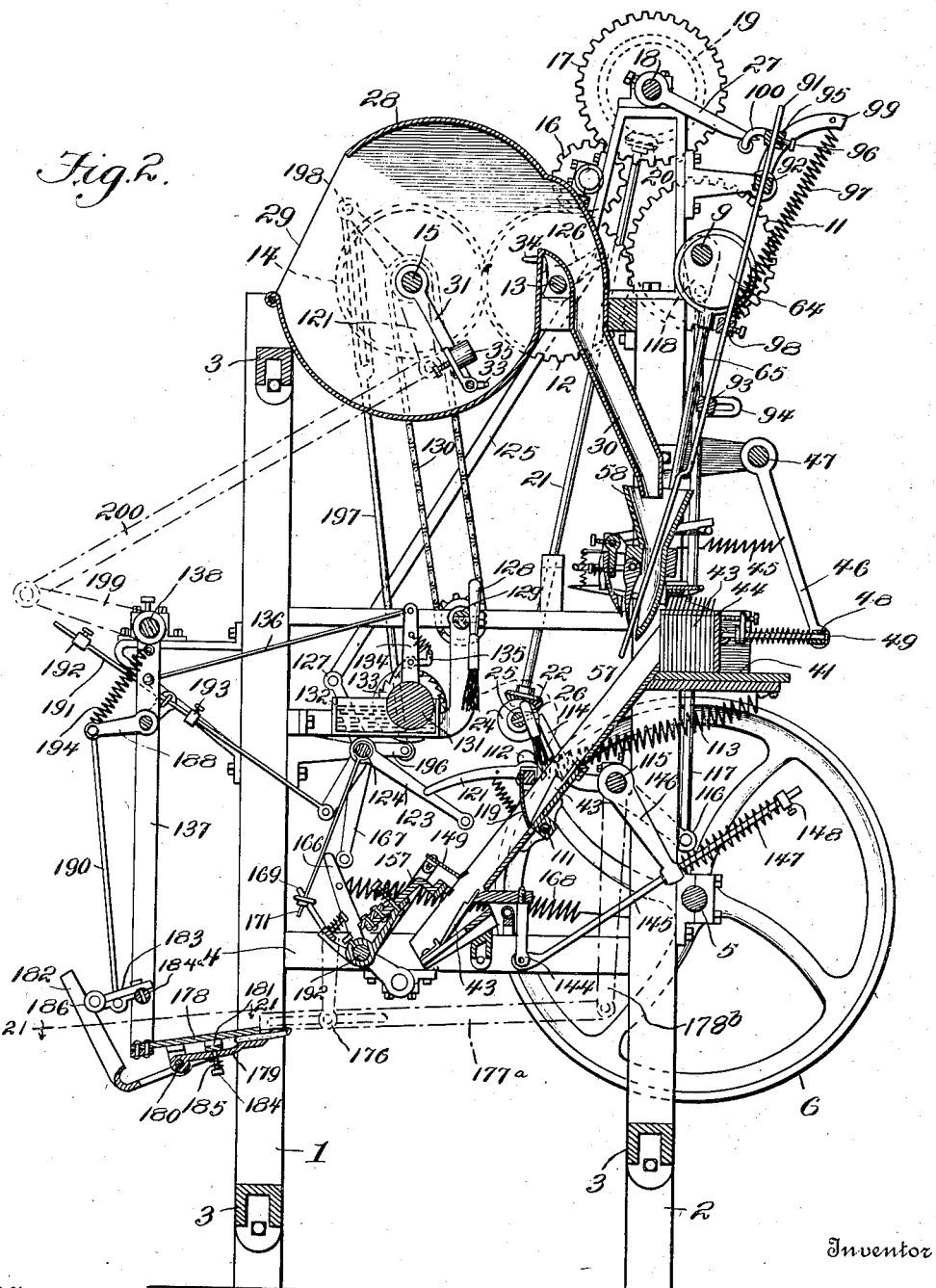

In the drawings: Figure 1 is a front view of a machine for filling and sealing packets embodying the invention. Fig. 2 is a transverse section on the line 2—2 of Fig. 1. Fig. 3 is a cross section of the hopper and delivery mechanism on the line 3—3 of Fig. 1. Fig. 4 is a sectional detail of a portion of the feeding mechanism on the line 4—4 of Fig. 3. Fig. 5 is a sectional detail of a measure and support therefor on the line 5—5 of Fig. 4. Fig. 6 is a front view of the series of bag holders and the adjunctive parts associated therewith, showing the same on a larger scale. Fig. 7 is a sectional view on the line 7—7 of Fig. 6, looking to the left, showing the position of the parts when the bag holders are at their highest position. Fig. 8 is a view similar to Fig. 7, showing the position of the parts when the bag holders are at the limit of their downward movement. Fig. 9 is a sectional detail on the line 9—9 of Fig. 6, looking to the left, showing the position of the parts when the bag holders are elevated. Fig. 10 is a horizontal section on the line 10—10 of Fig. 9. Fig. 11 is a sectional detail of the bag holding mechanism, showing the position of the magazine for receiving the bags and the chute leading therefrom, said section being taken on the line 11—11 of Fig. 6. Fig. 12 is a horizontal section on the line 12—12 of Fig. 11. Fig. 13 is a view similar to Fig. 11, showing the position of the parts when the bag holder is at the limit of its downward movement and the bag gripper moved so as to engage and retain the bag upon the holder. Fig. 14 is a sectional view of the bag holding mechanism on the line 14—14 of Fig. 6. Fig. 15 is a view of the parts illustrated in Fig. 14, showing the bag holding mechanism moved downward. Fig. 16 is a view of the parts shown in Fig. 14, illustrating the relative positions of the elements after the bag entering portion of the holder has been opened and made secure. Fig. 17 is a front view of the packet sealing mechanism on a larger scale, showing the lower portion of the chute through which the packets move, said view being indicated on the line 17—17 of Fig. 19. Fig. 18 is a sectional view on the line 18—18 of Fig. 17, showing the relation of the parts when the packet after having its sealing flap pasted reaches a position at the lower end of the chute preliminary to the operation of the sealing mechanism. Fig. 19 is a view of the parts shown in Fig. 18, illustrating their relation when the sealing flap is partly folded. Fig. 20 is a view of the parts shown in Fig. 19 after the sealing flap has been completely folded and pressed upon the body of the bag or container. Fig. 21 is a horizontal section of the delivery mechanism on the line 21—21 of Fig. 2, showing the parts on a larger scale. Fig. 22 is an enlarged section of the pasting mechanism and the parts intimately associated therewith, showing the delivery mechanism and the position of the latter when the packet is released. Fig. 23 is a view of the same parts illustrated in Fig. 22, showing the relative arrangement of the elements after the sealing flap of the packet has received paste and the position of the delivery mechanism after the latter has taken hold of a sealed packet preliminary to carrying the same to a point beyond the machine and discharging the packet. Fig. 24 is a detail of the several trip arms, which are concentrically mounted and adapted to operate the several parts connected with the pasting and delivery mechanisms.

Corresponding and like parts are referred to in the following description, and indicated in all the views of the drawings, by the same reference characters.

The working parts of the machine are mounted upon a suitable framework embodying front posts 1, rear posts 2 and suitable connecting bars 3 and 4, the bars 3 extending transversely of the machine and the bars 4 running longitudinally and connecting the uprights 1 and 2. The main shaft 5 is adapted to receive the power for driving the machine and is provided with a fly wheel 6 and a clutch 7, the latter being of any type to admit of throwing the machine into or out of operation when the shaft 5 is in motion, the shipping being effected by means of a hand lever 8. A transverse shaft 9 mounted near the upper rear portion of the framework is provided at one end with a pulley, which is connected by means of a drive belt 10 with a pulley secured upon the main shaft 5. A gear wheel 11 is secured to the opposite end portion of the shaft 9 and meshes with a gear wheel 12 secured to an end portion of a shaft 13 mounted upon the upper portion of the framework and paralleling the shaft 9. The gear wheel 12 meshes with a gear wheel 14 secured to an end portion of a shaft 15 mounted upon the upper portion of the framework and paralleling the shafts 9 and 13. A pinion 16, in mesh with the gear wheel 12, transmits power therefrom to a gear wheel 17 secured to one end of a transverse shaft 18, which is mounted upon brackets or extensions forming part of the framework. The gear wheel 17 has a crown gear 19 upon its outer side which meshes with a bevel pinion 20 secured to the upper end of a shaft 21, which inclines slightly to the perpendicular and is provided at its lower end with a bevel pinion 22, which meshes with a companion bevel pinion 24 secured to one end of a transverse shaft 25 to which the paste brushes 26 are secured. The shaft 18 has arms 27 secured thereto which are adapted to operate the ejector mechanism, which detaches the bags or containers from the holders after the material has been supplied thereto.

The feeding mechanism for supplying the material to the bags or containers in measured quantity comprises a hopper 28, which is approximately of cylindrical form and arranged approximately concentric with the shaft 15, said hopper having its front portion open, as indicated at 29. A series of spouts 30 lead rearwardly and downwardly from the upper portion of the hopper and direct the material to the bags or containers, it being understood that a spout is had for each bag holder. The spouts 30 merge into a head, which connects with the upper rear portion of the hopper 28. Arms 31 are secured to the shaft 15 and rotate therewith and support a shaft 32 at their outer ends, said shaft having a crank 33 at one end, which is adapted to engage a stop 34 near the upper rear portion of the hopper 28, so as to turn the shaft 32 and effect a discharge of the material from the measures or cups 35 secured to supports 36 attached to the shaft 32 so as to turn therewith. A spring 37 is secured at one end to one of the arms 31 and is connected at its opposite end to the adjacent support 36 so as to hold the series of supports in the plane of the arms 31. A short bar 38 projects laterally from one of the arms 31 and engages the adjacent support 36 to prevent rearward movement of the measures or cups when they are carried through the material contained in the hopper when the machine is in operation. The supports 36 consist of plates or arms attached to the shaft 32 and occupying the same relative plane, which corresponds with the plane in which the arms 31 lie. The measures or cups 35 are attached to the inner ends of the supports 36 and project forwardly therefrom so as to pass through the material and scoop up the same in the forward movement of the arms 31. When the cups 35 reach a point opposite the head or upper ends of the spouts 30 the crank 33 comes in contact with the stop 34 and is tripped thereby to cause the shaft 32 to make approximately a one-half revolution, whereby the cups are caused to assume a rearward position, as indicated most clearly by the dotted lines in Fig. 3, with the result that the material contained therein is discharged in the spouts 30 and directed thereby to the bags or containers. When the crank 33 clears the stop 34 the spring 37, which has been stretched by the turning of the shaft 32, contracts and returns the supports 36 and the cups to normal position. This operation takes place the instant the crank 33 clears the stop 34 and at the upper portion of the hopper where there is no material to impede or interfere with the return of the cups to a given position. The capacity of the cups or measures is regulable to admit of controlling the amount of material to be supplied to the packets. For this purpose a set screw 39 is threaded into each of the supports 36 and is provided at its inner end with a plate 40, which constitutes a false bottom for the cup or measure and which may be moved to a greater or less distance from the bottom of the cup to regulate the space for receiving the material.

The magazine for receiving the bags or containers to be filled is indicated at 41 and comprises a bottom and sides, the bottom being provided at its inner or delivery end with a stop 42 which arrests the forward movement of the bags or containers 43. A follower 44 operates in the magazine and supports the pile of bags or containers 43 and is pressed forward by means of a spring 45, which is attached at one end to the framework and at its opposite end to an arm 46, which is pivoted at 47 to an extension of the framework. An arm 46 is located at each side of the machine and the two arms are connected at their lower ends by means of a bar 48 to which rods 49 are attached, said rods connecting at their inner or forward ends with the followers 44. A spring 50ª is mounted upon each of the rods 49 and exerts a pressure upon a slide 50 loosely mounted upon the rod 49 and connected at its outer end by means of a set screw 51 with the follower, whereby provision is had for relatively adjusting the inclination of the follower according to the result to be obtained. The rods 49 are pivotally connected at 52 with the followers, thereby admitting the inclination of the followers being changed. Side pieces 53 are pivotally connected at 54 to the magazines or to the outermost walls of the extreme magazines. A bar 55 extends from one side piece 53 to the other cross the magazines and is provided with detents 56 for engaging with the flaps of the bags or containers to hold them from pressing forward too far so that the front portion of the bag in position to be next filled may stand open, as indicated most clearly in Fig. 11, with the result that the bill or entering portion of the bag holder may readily pass into the bag preliminary to discharging the material therein. The detent 56 consists of a spring having a horizontal portion to extend over the sealing flaps of the bags and a pendent portion to project in front of the foremost flap of the series to limit their movement forward when the bag to be filled next is in proper position for receiving the entering portion of the bag holder. The pendent portion of the detent 56 is approximately in vertical line with the stop 42, the two serving to arrest the forward movement of the bags and to properly position the foremost bag of the pile so that it may receive the entering portion of the bag holder when the latter is lowered to deliver the next charge of material to the bag or container. The chute 57 inclines forwardly and downwardly from the delivery end of the magazine. The bags or containers when filled and released from the bag holders move along the chute 57 to the pasting and sealing mechanisms. It is to be understood that a chute 57 is had for each magazine and constitutes a runway for the packets, each of the chutes comprising a bottom and retaining side pieces.

Each of the bag holders comprises a funnel 58 arranged to receive the material from a spout and a bag entering portion comprising members 59 and 60. The bag entering portion is shaped like a bill so as to readily pass into the bags or containers, the entering end being slender and tapered. The member 59 is fixed, whereas the member 60 is pivoted and secured to a transverse shaft 61, which is mounted in bearings applied to a transverse bar 62 which is provided at its ends with uprights 63. The bag holders are mounted to receive both a vertical and a lateral movement, the vertical movement causing the bill portions to enter and leave the bags, whereas the lateral movement serves to remove the filled bag from the magazine to clear the stop 42 and the pendent portion of the detent 56. The bag holders are mounted upon the transverse bar 62 and are movable therewith both vertically and laterally, the members 60 having an independent pivotal movement. The transverse bar 62 is moved vertically by means of eccentrics 64 secured to the shaft 9 and rods 65 connecting straps fitted upon the eccentrics to the uprights 63. The uprights 63 are provided with pins 66 and 67, which are arranged to operate in slots formed in guides 68 secured to the inner sides of the rear posts 2. Each of the guide plates 68 has an upper slot 69 comprising an upper vertical portion and a lower inclined portion, said slots having their members arranged relatively at an obtuse angle. The lower slots are formed at the four sides of a switch 70 and comprise vertical portions 71 and 72 and inclined portions 73 and 74. The slots 72 extend above the upper ends of the inclined slots 73 a distance to receive the pins 67 so as to clear the upper ends of the switches 70, as indicated most clearly in Fig. 7. The slots 71 extend below the inclined slots 74 a distance to admit of the pins 67 clearing the lower ends of the switch 70, as indicated most clearly in Fig. 8. A cross piece 75 is secured to each guide 68 and supports a shaft 76 to which the switch 70 is secured. The shaft 76 has an arm 77 at its inner end, to which a spring 78 is attached, said spring being normally under tension and having its upper end secured to the posts 2, so as to hold the switch 70 normally in the position indicated in Figs. 7 and 9. The vertical portion of the slots 69 corresponds to the length of the vertical slots 72 and the inclined portion of the slots 69 corresponds to the length of the inclined slots 73 or 74. When the bag holders are moved downward the pins 66 and 67 travel in the slots 69 and 72 and 74 and during the first part of their downward movement the bag holders move in a vertical plane and during the remainder of their movement the bag holders move forwardly and downwardly, thereby opening the bags and moving the upper portion thereof forward, as indicated most clearly in Fig. 13. When the pins 67 are traveling through the inclined slots 74 the lower ends of the switches 70 are pressed forward and the instant the pins 67 clear the lower extremities of the switches the latter are moved rearward at their lower ends by the springs 78, so that upon the upward movement of the bag holders the pins 67 travel in the vertical slots 71 and thence through the inclined slots 73 to the point of beginning at the upper ends of the vertical slots 72. The switches 70 are automatic in action, being pressed forward at their lower ends by the pins 67 against the tension of the springs 78 and again returned to normal position by said springs 78.

A bag gripper is had for each bag holder and is secured to a shaft 79, which is mounted in bearings applied to the transverse bar 62. Each of the bag grippers comprises two members 80 and 81, the members 80 being fastened to the shaft 79, whereas the members 81 are loose upon said shaft. The upper ends of the members 81 are forked so as to embrace opposite ends of the sleeve portions of the member 80 through which the shaft 79 passes and the lower ends of the members 81 project below the members 80 so as to come in contact with the sides of the movable members 60 of the bag holders so as to grip and retain the bags in place thereon. Pins 82 pass through openings formed in the members 80 and 81 and their outer ends receive springs 83 by means of which the members 81 are held pressed against the members 80. This arrangement admits of the members 81 having a movement independently of the members 80 so as to follow the movements of the bag holders or the movable members 60 thereof. This is indicated most clearly in Fig. 13, which shows the members 80 and 81 separated at their lower ends. The bag grippers are operated by a turning of the shaft 79, which is effected automatically by the following means: An arm 84 is secured at one end to the shaft 79 and is adapted to engage a stop 85 when the bag holders are at the limit of their downward movement so as to turn the shaft 79 and throw the lower ends of the bag grippers into engagement with the bag holders. After the grippers have taken hold of the bags in position to be filled they are locked in operative position by means of a catch 86, which is pivoted to the adjacent upright 63, said catch engaging an arm 87 fastened to the shaft 79 and preferably forming a part of the arm 84. A spring 88 normally exerts an upward pull upon the outer end of the catch 86 so as to cause the stop thereof to engage with the lower end of the arm 87 when the same is pressed rearward by contact of the arm 84 with the stop 85. The spring 88 is connected at its upper end to a bracket or support secured to the adjacent upright 63. A spring 89 is secured at one end to the arm 84 and at its opposite end to the upright 63 to which the catch 86 is pivoted, said spring normally tending to pull the free end of the arm 84 downward so as to carry the bag grippers away from the bag holders. As the bag holders reach the limit of their downward movement the arm 84 is pressed upward by coming in contact with the stop 85, thereby increasing the tension of the spring 89. A stop 90 secured to the post 2 is adapted to engage the forward end of the catch 86 upon the upward movement of the bag holders and thereby depress said catch and release the arm 87, thereby admitting of the spring 89 coming into play and moving the shaft 79 so as to throw the bag grippers outward and away from the bag holders and releasing the bags carried thereby. The bag holders move upward a distance before releasing the bags, thereby removing the bags wholly from the magazine. The forward movement of the bag holders at the limit of their downward movement serves to open the bags and also to bring the forward end of the catch 86 into the path of the stop 90, whereby the catch is tripped as the bag holders ascend, thereby releasing the bags at the proper time.

Rods 91 are arranged to operate through the bag holders and constitute ejectors for detaching the bags from the holders when filled. The rods 91 are mounted in guide bars 92 and 93, which extend transversely of the machine, the bar 92 being pivotally mounted, whereas the bar 93 is supported in guides 94 and is movable forwardly and backwardly so as to follow the movements of the ejectors. A bar 95 receives the upper ends of the ejectors, the latter being adjustably secured thereto by suitable fastening means, such as set screws 96. A spring 97 exerts an upward pull upon a bar 98 through which the ejectors pass and to which they are secured, said spring being attached at its upper end to a bracket 99 forming a part of the framework. An arm 100 is secured to the bar 95 and is provided with a roller arranged to be engaged by the arm 27, whereby the ejectors are depressed at the proper time so as to detach the bags from the holders, which operation occurs a moment after the bags are released from the grippers. The ejectors are depressed by the arm 27 and are elevated by the spring 97.

The jaws or members 59 and 60 forming parts of the bill or bag entering portion of the holders are normally held closed during the lowering of the bag holders and the entrance of their bills into the bags by means of spring action. As shown an arm 101 is secured to an end portion of the shaft 61 and projects therefrom in an approximate horizontal direction and is connected by means of a spring 102 with an arm 103 extended from an upright 63. An arm 104 projects in an upright direction from the shaft 61 and pivotally supports a catch 105, which is acted upon by means of a spring 106 to draw its forward or active end downward, said spring being secured at its lower end to a bracket 107 attached to the transverse bars 62. The bracket 107 extends above the bar 62 and is adapted to engage the shoulder or stop of the catch 105 so as to hold the movable members 60 of the bag holders when thrown into open position to admit of the material discharging into the bags. A stop 108 is adapted to engage the arm 101 and elevate the outer end thereof and turn the shaft 61 so as to open the members 60 and at the same time throw the upper end of the arm 104 forward and carry the catch 105 therewith, whereby the rear end of the catch is disengaged from a stop 109, both stops 108 and 109 being attached to the adjacent post 2. When the bag holders reach a given point in their upward movement the rear end of the catch 105 engages with the stop 109, with the result that the forward end of the catch 105 is raised and disengaged from the stop 107, thereby permitting the spring 102 to operate to turn the shaft 61 and close the members of the bag holders.

The chute 57 is provided intermediate of its upper and lower ends with a movable portion 110, which is mounted upon a transverse shaft 111. The movable portions 110 normally come flush with the bottom of the respective chutes to admit of the packets or filled bags passing thereover. An arm 112 is secured to an end portion of the shaft 111 and is adapted to be depressed at its upper end to cause the shaft 111 to turn and to throw the upper ends of the movable portions 110 forward. A spring 113 normally exerts a pulling force upon the arm 112 to draw the same rearward and hold the movable parts 110 of the chutes in closed position. An arm 114 is secured to a shaft 115 and is adapted to engage the arm 112 to effect a forward movement of the parts 110. An arm 116, secured to the shaft 115, is connected by means of a rod 117 with a crank arm 118 secured to the shaft 9. The parts are so timed that when a packet 43 reaches the part 110 and is held thereon the shaft 115 is rocked to throw the parts 110 forwardly and elevate the packets, as indicated most clearly in Fig. 22, to admit of the sealing flaps having paste applied thereto. The packets are pasted in their descent upon the chutes and retained in position upon the parts 110 by means of retarders 119, which are attached to a shaft 120, said retarders consisting of spring plates. An arm 121, secured to the shaft 120, is normally drawn downward at its outer end by means of a spring 122 and extends across the path of a lateral extension at the outer end of an arm 123, which is secured to a shaft 124 which is adapted to be operated from the shaft 13 by means of a connection 125, which is attached at its upper end to a crank arm 126 attached to the shaft 13 and at its lower end to an arm 127 fastened to the shaft 124. The retarders 119 occupy the position shown most clearly in Fig. 2, that is with their lower ends touching the lower portions of the parts 110 so as to arrest the filled bags in their movement over the chutes. After the packets have reached the position indicated in Fig. 2 the shaft 115 has a rocking movement imparted thereto, which brings the arm 114 in contact with the arm 112, thereby throwing the upper ends of the parts 110 forwardly, as indicated in Fig. 22, to bring the sealing flaps in position to receive paste from the brushes 26, after which the shaft 115 is rocked backward, thereby releasing the arm 112 and admitting of the spring 113 returning the parts 110 to normal position when the arm 121 is thrown upward at its outer end by contact of the arm 123 therewith, with the result that the shaft 120 is turned to throw the lower ends of the retarders 119 away from the parts 110 and the packets 43 being released again move forward upon the chutes to the sealing mechanism.

The paste brushes 26 are revolved with the shaft 25 in the manner stated, the parts being so timed that when the packets are thrown forward by the parts 110 their sealing flaps have paste applied thereto. The brushes 26 are supplied with paste by means of brushes 128 which are attached to a shaft 129, which is arranged transversely of the machine and mounted in suitable bearing, said shaft being rotated from the shaft 15 by means of a sprocket chain 130 passing around sprocket wheels applied to the respective shafts 15 and 129. The brushes 128 act as distributing means to supply paste to the brushes 26 and in turn receive paste from a roller 131, which is arranged to operate in a box or receptacle 132 containing a quantity of paste. The roller 131 is slowly rotated by means of a ratchet mechanism consisting of a ratchet wheel 133 fastened to an end of the roller and an arm 134 loosely mounted upon a journal of the roller 131 and provided with a spring actuated dog 135 adapted to engage with the teeth of the ratchet wheel 133. A rod 136 connects the arm 134 with a side member of a frame 137, which is mounted upon a shaft 138. The frame 137 is oscillated and imparts a corresponding movement to the arm 134, which, through the ratchet mechanism, imparts an intermittent rotary movement to the paste distributing roller 131. The brushes 128 receive a supply of paste from the roller 131 and act as feeders for the brushes 26.

The sealing mechanism is located at the lower end of the chute 57 and comprises means for folding the sealing flaps and pressing the same upon the body of the bags or containers. At the lower end of the chute 57 is located a rest 139 having a stop 140ª at its lower end to arrest the descent of the packet 43 after the same has been pasted. The rest 139 has its upper portion spaced from the bottom of the chute and through this space operates a sealing head 140, which folds the sealing flap of the bag and presses the same upon the packet. The sealing head is heated so as to set or partially dry the paste or adhesive and thereby prevent opening of the flap after the same has been pressed upon the packet and relieved of the pressure of the sealing head. A burner 141 is located beneath the sealing head and is supplied with fuel from a tank 142, which is located near the top of the machine so as to supply fuel to the burner by gravity feed. The burner 141 may be of any type, such as commonly employed for consuming oil. The sealing head 140 is pivoted at 143 and has an oscillatory movement imparted thereto. An arm 144 extends rearwardly and downwardly from the sealing head and is connected by means of a rod 145 with an arm 146 secured to an end portion of the shaft 115. The rod 145 plays loosely through the arm 146 and a spring 147 mounted on the rod 145 is confined between the arm 146 and a stop or set collar 148 adjustable upon the outer end of the rod 145. When the shaft 115 turns to the left the lower end of the arm 146 is moved rearward, thereby exerting an upward and a rearward pull upon the rod 145, with the result that the sealing head 140 is moved forward through the space formed between the bottom of the chute 57 and the upper end of the rest 139, thereby completing the fold of the sealing flap and pressing the same upon the packet. A presser head 149 is arranged to exert a downward pressure upon the body of the packet to force the same close upon the rest 139, such operation serving to initially fold the sealing flap of the packet, as indicated most clearly in Fig. 19. The packet when it reaches the lower end of the chute occupies the position indicated in Fig. 18, after which the presser head 149 is moved downward to bring the packet in close contact with the rest 139, the sealing flap of the packet being partly folded and subsequently completely folded and sealed by the action of the sealing head 140, as indicated in Fig. 20. Arms 150 and 151 connect the presser head with a shaft 152, which is mounted in bearings near the lower end of the framework. The arms 150 and 151 are pivotally connected at 153 and are arranged to break joint in an upward direction, thereby drawing the presser head forwardly, which is essential to clear the sealing flap during the operation of the sealing head. The presser head 149 remains in contact with the packet during its forward movement, which latter is sufficient to clear the sealing flap of the packet when closing thereon. The presser head 149 is of L-form in cross section, the horizontal flange constituting the presser member and the vertical flange receiving the supporting means.

Pins 154 project from the presser head and are slidably mounted in sleeves 155 formed at the upper ends of vertical extensions of a cross head 156, which is secured to one end of an arm 157, which is attached to a supplementary arm 158 loose upon the shaft 152, the two arms 157 and 158 being bolted or otherwise connected. Springs 159 are mounted upon the pins 154 and are confined between the sleeves 155 and adjustable stops upon the pins 154. The springs 159 serve to move the presser heads 149 toward the cross heads 156 when the joints between the arms 150 and 151 are broken. The arms 151 are pivotally connected to the presser heads 149, this result being accomplished by bars 160, which are secured to the presser heads and have their end portions offset and made rounding to provide journals, which pass through openings formed in the ends of the arms 151. When the arms 150 and 151 are in line the presser heads 149 are moved downward from the cross heads 156 so as to engage the packets near their open ends, but when the sealing flaps are folded the presser heads 149 are moved away from the open ends of the packets a distance to clear the sealing flaps and admit of their folding and sealing. The arms 150 are loosely mounted upon the shaft 152 and have extensions 161 at their lower forward ends which project upwardly and receive pins 162 upon which are mounted springs 163. The pins 162 pass through a cross bar 164, which is supported at its ends by arms 165 loosely mounted upon the shaft 152. The springs 163 are confined between the cross bar 164 and adjustable stops upon the pins 162 and when the cross bar 164 is thrown toward the chute the arms 161 are correspondingly moved, thereby causing the presser heads and cross heads to engage with the packets and force the same upon the rests 139 by means of a yielding pressure due to the action of the springs 163. An arm 166 projects from the shaft 152 and is adapted to be engaged by an arm 167 mounted upon the shaft 124 and movable therewith. A spring 168 normally exerts a rearward pull upon the arm 166 to bring the presser heads 149 and the cross heads 156 in contact with the rests 139. The presser and cross heads are held elevated or away from the rests 139 by the action of the arm 167 engaging the arm 166. One of the arms 165 has an extension 169, which is provided at its outer end with an eye 170 through which a rod 171 passes, said rod being loosely mounted upon the shaft 124 and having an adjustable stop 172 for limiting the movement of the extension 169 and the presser and cross heads when thrown away from the rests 139 by the action of the arm 167 upon the arm 166. A series of arms 173 are fastened to the shaft 152 to turn therewith and the arms 158 have the end portions mounted upon the shaft 152 bifurcated so as to embrace the hubs of the arms 173. Pins 174, supported by the arms 173, pass loosely through openings formed in the arms 157 and support springs 175, which are confined between the arms 157 and adjustable stops on the upper ends of the pins 174. It will thus be understood that there is a yieldable connection between the arms 173 and 157, hence provision is had for a continued movement of the shaft 152 and the arms 173 after movement of the arms 157 has been arrested by engagement of the cross heads 156 with the packets 43, such arrangement providing for variation in the bulk of the packets. An arm 176 projects from one of the arms 165 and has a limited running connection with a bar 177$^a$, which is pivotally connected to an arm 178$^b$ secured to the shaft 115. At the proper time, that is immediately prior to the operation of the sealing head, the connecting bar 177$^a$ is operated to exert a rearward pull upon the arm 176, thereby turning the arms 165 and moving the cross bar 164 connected therewith and breaking the joint between the arms 150 and 151, whereby the presser head 149 is drawn forward out of the way of the sealing heads and the sealing flaps so as not to interfere with the proper sealing of the packets.

The delivery mechanism comprises the frame 137, which is approximately of U-form comprising side members and a lower horizontal member, the side members being secured to the shaft 138 to turn therewith. Jaws 178 and 179 are located at the lower end of the frame and are adapted to grip the packets and remove them from the rests 139 of the sealing mechanism and carry said packets to the required point of discharge. The jaws 178 are relatively fixed, whereas the jaws 179 are movable, being mounted upon a rod 180 supported in lugs attached to the jaws 178. A cross bar 181 is secured to one end of a forked lever, which is loosely mounted upon the rod 180, said forked lever having an upright extension 182 adapted to be engaged by an arm 183 pivoted at 184$^a$ to a shaft mounted in the side members of the swinging frame 137. Pins 184 are connected with the cross bar 181 and pass loosely through the pivoted jaws 179 and receive springs 185, which are mounted thereon and confined between the jaws 179 and adjustable stops of said pins 184. The jaws 179 are closed by means of the forked lever when the upper end of the extension 182 is pressed outward by action of the arm 183. By reason of the spring connection between the forked lever 182 and the jaws 179 the latter may adapt themselves to variations in the bulk of the packets, thereby admitting of the jaws securely gripping the said packets. When the arm 183 is pressed downward its outer end engages a depression 186 formed in the arm 182, thereby holding the arm 183 depressed and the jaws 179 in closed position. A shaft 187 is mounted in the side members of the frame 137 and is provided with arms 188 and 189, the arm 188 being connected by means of a rod 190 with the arm 183 and the arm 189 having an eye through which a rod 191 passes, said rod having stops 192 and 193, which are adapted to engage the eye carried by the arm 189 so as to operate the shaft 187 and the arm 183 at the proper time. A spring 194 connects the arm 188 with a convenient point of the machine to normally exert an upward pull upon the arm 188 so as to withdraw the arm 183 from engagement with the arm 182 when the arm 189 is tripped by the action of the stop 192. The rod 191 is connected to an arm 195, which is secured to the shaft 124 to turn therewith. The shaft 124 is adapted to be rocked by means of an arm 196, which is connected by means of a rod 197 with an arm 198 secured to an end portion of the shaft 15, the rod 197 having its upper end slotted or otherwise constructed to make running connection with the arm 198 so as to allow for a limited play. The frame 137 carrying the delivery mechanism is swung toward and away from the sealing mechanism by a rocking movement of the shaft 138, which is actuated by means of an arm 199 fastened thereto and connected by means of a bar 200 with an arm 201 fastened to the shaft 15.

In the operation of the machine the seed or other material to be placed upon the market is supplied in bulk to the hopper 28 and is delivered therefrom intermittently in predetermined quantities corresponding to the amount to be placed in each bag or container. When the machine is in operation the shaft 15 is continuously rotated in a direction contrariwise to the direction of travel of the hands of a clock, thereby causing the feeder to move upwardly upon the right hand side of the hopper and when the shaft 32 reaches a position to bring the measures 35 opposite the upper ends of the spouts 30 said shaft is rocked by means of the stop 33 coming in contact with the stop 34, thereby tilting the measures so as to deposit the seed or other material into the spouts 30. The material is directed by the spouts 30 into the funnels 58 of the bag holders and is retained in the holders until such time as the bags have been received upon the lower ends of the holders, after which the members of the bag entering portions of the holders open, thereby permitting the material to pass from the holders into the bags. The holders are now moved forwardly and upwardly, thereby removing the filled bags from the magazines and a moment thereafter the bags are released and detached from the holders and slide downward upon the chutes 57 and are arrested in their descent in proper position in the manner stated to admit of the sealing flaps receiving paste, after which the bags are again released and move downward upon the chutes until again arrested in position opposite the sealing mechanism, when the flaps are folded and sealed. The delivery mechanism at this stage of the operation comes into play in the manner stated and removes the packages from the sealing mechanism and carries the packages to the required point of discharge, thereby completing the operation.

From the foregoing description taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a bag filling machine embodying supporting means for the filled bags while in transit from the filling mechanism to the sealing mechanism, elevating means in the length of said supporting means for lifting the bags, and means for supplying paste to the sealing flaps of the bags when lifted.

2. In a bag filling machine embodying a support for sustaining the filled bags while in transit from the filling mechanism to the sealing mechanism, elevating means in the length of said support for lifting the bags, a brush arranged to supply paste to the sealing flaps of the bags when lifted, means for imparting rotary movement to the brush, a second brush arranged to supply paste to the first mentioned brush at a point in the rotation thereof, a paste distributer, and means for imparting rotary movement to said second brush.

3. In a bag filling machine embodying a chute over which the bags when filled pass, said chute having a movable portion, means for arresting the package in its movement over the chute opposite the movable portion thereof, means for elevating the movable portion of the chute, and means for applying paste to the sealing flap of the package while held in elevated position.

4. In a bag filling machine embodying a chute over which the filled bags pass, said chute having a movable portion, means for arresting the bags in their travel and retaining the same upon the movable portion of the chute, a paster, and means for elevating the movable portion of the chute to throw the sealing flap of the bag thereon in position to receive paste from said paster.

5. In a bag filling machine embodying a chute over which the bags when filled are caused to pass, said chute having a movable portion, a retarder located opposite the movable portion of the chute for arresting the bags and holding the same in position thereon, means for yieldingly holding the retarder in engagement with the movable portion of the chute, a paster, and means for operating the movable portion of the chute to bring the sealing flap of the package in position for receiving paste.

6. In a bag filling machine comprising a chute for supporting the bags when filled while in transit to the sealing mechanism, a movable portion in the length of the chute, means for raising said movable portion, a retarder for holding the bag upon said movable portion, means for yieldingly retaining the retarder in operative position during the movement of said movable portion, means for applying paste to the sealing flap of the bag while the latter is held elevated, and means for automatically returning said movable portion of the chute to normal position and releasing the retarder from the bag.

7. In a bag filling machine the combination of a chute for supporting the bags when filled while in transit to the sealing mechanism, a movable portion in the length of the chute, a retarder yieldingly held in contact with the movable portion of the chute to arrest the forward movement of the bags when filled, a paster, means for elevating the movable portion of the chute to bring the sealing flap of the bag thereon in position to receive paste, means for automatically returning said movable portion to normal position, and means for moving the retarder to release the bag to admit of the latter continuing its movement to the sealing mechanism.

8. In a bag filling machine, the combination of a chute for supporting the bags when filled, a movable portion in the length of the chute, a retarder yieldingly held in contact with said movable portion, means for elevating the movable portion, a paster for applying paste to the sealing flap of the bag while held elevated, means for supplying the paster with paste, means for returning the movable portion of the chute to normal position, and means for moving the retarder to release the package after its sealing flap has received paste.

9. In a machine for filling bags, a bag holder comprising funnel and bill-shaped portions, the latter comprising members which are adapted to separate, means for supplying material to the funnel-shaped portion, means for parting the members of the bill portion to admit of the material discharging from the holder into the bag, and an ejector arranged to operate between the members of the bill for detaching the bag therefrom.

10. In a machine for filling bags, a bag holder comprising funnel and bill-shaped portions, the latter comprising members which are adapted to separate, means for supplying material to the funnel-shaped portion, means for parting the members of the bill portion to admit of the material discharging from the holder into the bag, an ejector for detaching the filled bag from the holder, said ejector arranged to operate through the funnel and bill-shaped portions of the holder to detach the filled bag from the members of the bill.

11. In a bag filling machine, the combination of a bag holder comprising relatively movable members, means for yieldingly holding said members closed, a catch, connecting means between said catch and the movable member of the bag holder, a stop adapted to engage said catch, trip means for simultaneously opening the members of the bag holder and bringing the catch into position for engaging said stop to hold the bag holding members open, and other means for tripping the catch to disengage the same from the stop to admit of the members of the bag holder automatically closing.

12. In a bag filling machine, the combination of a bag holder comprising relatively movable members, an arm having connection with a movable member of the bag holder, means normally holding the said members closed by a yielding pressure, a catch having connection with said arm, a stop to engage said catch, means for moving the bag holder vertically, upper and lower stops for engaging the aforesaid arm to effect an opening of the members of the bag holder when the latter is at its lowest position and to permit a closing of said members when the bag holder is at its highest position.

13. In a bag filling machine, the combination of a bag holder comprising separable members, means for raising and lowering the bag holder, an arm having connection with the movable member, a spring for holding said members closed, a catch having connection with said arm and movable member of the bag holder, a stop for automatically engaging said catch, a lower stop for engaging the said arm to effect an opening of the bag holding members and to move said catch into position to engage said stop to hold said members in open position, and an upper stop for engaging said catch to effect disengagement thereof from the stop to admit of automatic closing of the bag holding members.

14. In a bag filling machine, the combination of a bag holder comprising a fixed and a pivoted member, a lateral arm connected with said pivoted member, an upright arm having connection with said pivoted member and lateral arm, a catch pivoted upon the upright arm, a stop for engaging said catch, a spring normally pressing the catch toward the stop, a spring normally exerting a pressure to hold the pivoted member in closed position, means for raising and lowering the bag holder, a stop for engaging the lateral arm to open the members of the bag holder and to bring the catch in engagement with the stop, and a second stop for engaging the catch to effect disengagement thereof from the stop to admit of automatic closing of the members.

15. In a bag filling machine, the combination of a magazine for receiving a pile of bags, a bag holder, means for imparting a vertical movement to the bag holder to cause the same to enter the foremost bag of the pile, a pin and slot connection between the bag holder and the supporting frame for giving proper direction to the bag holder, and a switch arranged in the slot to coöperate with the pin to cause the bag holder to travel vertically and forward and backward.

16. In a bag filling machine, the combination of a magazine, a bag holder, a support for the bag holder, a guide plate, means for imparting a vertical reciprocating movement to the bag support, upper and lower slots formed in the guide plate, the upper slot comprising a vertical and an inclined portion, the lower slot comprising parallel, vertical and inclined portions, upper and lower pins projected from the bag holder support and entering said upper and lower slots, and a switch mounted in the lower slot to direct the lower pin from the inclined to the vertical slots to cause the bag holder to receive a vertical and a forward and a backward movement.

17. In combination a bag holder, means for imparting a vertical reciprocating movement thereto, a guide plate having upper and lower slots, the upper slot comprising a vertical and an inclined portion, a switch arranged in the lower slot to form parallel, vertical and inclined portions, a spring for yieldingly holding the switch in a given position, and pins having connection with said bag holder and arranged to operate in the upper and lower slots of the guide plates.

18. In combination a bag holder, means for imparting a vertical reciprocating movement thereto, a guide plate having upper and lower slots, the upper slot comprising vertical and inclined portions, a switch located in the lower slot forming parallel, vertical and inclined slots, the outer ends of the vertical slots extending beyond the outer ends of the adjacent inclined slots, and upper and lower pins connected with the bag holder and arranged to operate in the respective upper and lower slots.

19. In combination a bag holder, means for imparting a vertical reciprocating movement thereto, a guide plate having upper and lower slots, the upper slot comprising vertical and inclined portions, a switch located in the lower slot forming parallel, vertical and inclined slots, the outer ends of the vertical slots extending beyond the outer ends of the adjacent inclined slots, upper and lower pins connected with the bag holder and arranged to operate in the respective upper and lower slots, a crank arm connected with the switch, and a spring exerting a pressure upon said crank arm to hold the switch in given position.

20. In combination a bag holder comprising a bag entering portion formed of a fixed and a movable member, a bag gripper comprising two members yieldingly held together, one of said members adapted to engage the movable member of the bag holder to retain the bag thereon, and operating means for the bag gripper.

21. In combination a magazine adapted to receive a pile of bags, a follower, a rod having pivotal connection with the follower, means for applying force to the rod to move the follower forward, a slide mounted upon the rod, a spring exerting a pressure upon said slide, and a set screw threaded into the slide and exerting a pressure upon the follower to one side of the pivotal connection of the said rod therewith.

22. In a bag filling machine comprising a chute over which the bags when filled pass, said chute comprising a depressed portion forming a rest, means for holding the bags upon said rest, a pressure head for confining the bags to said rest, and a sealing head arranged to operate through the space formed between the chute and the rest for folding and pressing the sealing flap of the bag upon the body portion thereof.

23. In a bag filling machine, the combination of a chute over which the bags when filled pass, a rest spaced from the delivery end of the chute and provided with a stop to limit the bags in their movement and properly position the same upon the rest, a pressure head for forcing the bags upon the rest, a sealing head, means for imparting a pivotal movement to the sealing head for folding and pressing the sealing flaps of the bag upon the body thereof, and means for imparting a movement to the pressure head to clear the sealing flaps in advance of the operation of the sealing head.

24. In combination a chute for supporting packets to be sealed and having paste applied to their sealing flaps, a rest spaced from the delivery end of the chute and having a stop to properly position the bags thereon, a sealing head for supporting the open ends of the bags in elevated position, a pressure head for forcing the bags upon the rest and initially folding the sealing flaps thereof, means for imparting a pivotal movement to the sealing head to complete the folding of the sealing flaps and to press the same upon the body of the bags, and means for moving said pressure head while in contact with the bag to clear the sealing flaps in advance of the operation of the sealing head.

25. In combination a support for receiving packets to be sealed, a shaft, an arm having connection with said shaft and supporting the pressure head, means for moving the arm to carry the pressure head toward and from the packet support, and arms having pivotal connection with one another and with the said shaft and pressure head to effect longitudinal movement of the latter.

26. In combination a support for receiving a packet to be sealed, a cross head for holding the packet upon the support, means for carrying said cross head, a pressure head supplementing the action of the cross head, pins slidably connecting the pressure head with the cross head, springs mounted upon said pins and normally exerting a force to draw the pressure heads toward the cross head, and means for moving the pressure head away from the cross head against the tension of the said springs.

27. In combination a support for receiving a packet to be sealed, a cross head having its end portions upturned and provided with sleeves, supporting means for said cross head, a pressure head, pins connected with the pressure head and mounted in the sleeves of the cross head, springs mounted upon the pins and confined between stops thereon and said sleeves, means for moving the cross head and the pressure head toward and away from the packet support, and other means for moving the pressure head away from the cross head.

28. In combination a rest, a shaft, an arm secured to the shaft, a cross head carried by said arm and adapted to hold a packet upon the said rest, a pressure head movable with the cross head, arms pivotally connected to each other and to the pressure head and loosely mounted upon the said shaft, and means for breaking joint between the pivoted arms to move the pressure head toward and away from the cross head.

29. In combination a rest, a shaft, an arm secured to the shaft and adapted to turn therewith, a second arm yieldably connected with the first mentioned arm, a cross head carried by said second arm and adapted to hold a packet upon the rest, a pressure head movable with the cross head and supplementing the action thereto to hold the packet upon the rest, arms pivoted to each other and to the pressure head and loosely mounted upon the said shaft, and means for breaking joint between said arms to move the pressure head toward and away from the cross head.

30. In combination a rest, a shaft, an arm secured to the shaft to turn therewith, a second arm loose upon said shaft and extending beyond the first mentioned arm, a yieldable connection between the two arms, a cross head mounted upon the outer end of the second arm, a pressure head having slidable connection with the cross head and movable therewith, pivoted arms loosely mounted upon the said shaft and having pivotal connection with the said pressure head, and means for breaking joint between the pivoted arms to move the pressure head toward and away from the cross head.

31. In combination a rest, a shaft, a cross head adapted to hold a packet to be sealed upon the rest, an arm mounted upon said shaft to turn therewith and having said cross head connected therewith, means for turning the shaft to move the cross head toward and away from the rest, a pressure head slidably connected with said cross head, pivoted arms loosely mounted upon the said shaft and having pivotal connection with the pressure head, an extension projected laterally from the pivoted arm mounted directly upon said shaft, a second arm loose upon the said shaft, a yielding connection between said second arm and the extension of the pivoted arm, and means for imparting movement to said second arm for operating the pivoted arms to break joint thereof.

32. In combination a rest, a shaft, means for imparting rotary movement to said shaft, arms secured to the shaft to turn therewith, other arms loose upon the shaft and extending beyond the first mentioned arms, yielding connections between the two arms, cross heads attached to the outer ends of said second arms, pressure heads slidably connected with the cross heads, pivoted arms loosely mounted upon said shaft and having pivotal connection with the pressure heads, the pivoted arms mounted directly upon the shaft having extensions, a third set of arms loosely mounted upon the said shaft, a cross bar connecting the third set of arms, yielding connections between the cross bar and the extensions of the pivoted arms, one of the third set of arms having an extension, a rod having sliding connection with the last mentioned extension, and stops upon said rod to engage the extension to move the same and the third set of arms for breaking joint between the pivoted arms to effect a movement of the pressure heads toward and away from the cross heads.

33. In a bag filling machine and in combination with the sealing mechanism embodying a rest, a delivery mechanism for removing the sealed packets from the rest and carrying the same to a convenient point of discharge, said delivery mechanism embodying a pivoted frame, means for imparting a swinging movement to said frame, jaws mounted upon the frame, means for opening the jaws to admit of the sealed packet passing between them, means for closing said jaws upon the packet, and means for opening the jaws provided the frame is swung outward to effect release of the packet held thereby.

34. In a bag filling machine embodying sealing mechanism, a delivery mechanism for removing the sealed packets from the machine and carrying the same to a convenient point of discharge, said mechanism embodying a frame, means for swinging the frame toward and away from the sealing mechanism, a fixed jaw carried by the frame, a pivoted jaw mounted upon the frame and adapted to coöperate with the fixed jaw, means for positively opening the jaws to admit of the sealed packet being received between them, means for holding said jaws closed during the outward movement of the frame when carrying the sealed packet away from the machine, and means for releasing the jaws to admit of discharge of the packet therefrom.

35. In a bag filling machine embodying a sealing mechanism, delivery mechanism for effecting discharge of the sealed packets, the same comprising a frame, means for moving the frame toward and away from the sealing mechanism, a fixed jaw carried by the frame, a pivoted jaw mounted upon said frame, a lever, a yielding connection between said lever and pivoted jaw, means mounted upon the frame for operating said lever to close the jaws upon the packet and forming a lock to hold said jaws closed, and means for releasing the lever to permit discharge of the packet.

In testimony whereof I affix my signature in presence of two witnesses.

JESSE LINES.

Witnesses:
 CHARLES T. ROOK,
 ARCHER CARY.